(12) United States Patent
Priesemuth

(10) Patent No.: US 6,812,415 B1
(45) Date of Patent: Nov. 2, 2004

(54) MULTIFUNCTION SWITCH

(75) Inventor: Wolfgang Priesemuth, Wasserburg (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/581,793

(22) PCT Filed: Dec. 16, 1998

(86) PCT No.: PCT/EP98/08266

§ 371 (c)(1),
(2), (4) Date: Aug. 6, 2001

(87) PCT Pub. No.: WO99/30928

PCT Pub. Date: Jun. 24, 1999

(30) Foreign Application Priority Data

Dec. 17, 1997 (DE) .......................... 197 56 052

(51) Int. Cl.⁷ ................................. H01H 9/26
(52) U.S. Cl. ..................... 200/5 R; 200/6 A
(58) Field of Search ................. 200/6 A, 5 R, 200/19.05, 19.18, 136, 180, 18, 19.07, 4, 5 A, 5 E, 6 R, 47 R, 522, 330, 313–315, 714, 118, 14, 17 R, 6 C, 336; 338/128, 131, 133

(56) References Cited

U.S. PATENT DOCUMENTS

| | | | |
|---|---|---|---|
| 4,330,694 A | | 5/1982 | Ogawa |
| 4,428,649 A | * | 1/1984 | Main et al. ................ 359/876 |
| 4,590,338 A | * | 5/1986 | Suzuki ..................... 200/5 R |
| 4,698,463 A | * | 10/1987 | Tanaka et al. ............. 200/5 R |
| 5,151,563 A | | 9/1992 | Tanaka |
| 5,430,262 A | * | 7/1995 | Matsui et al. .............. 200/5 A |
| 5,468,924 A | * | 11/1995 | Naitou et al. ............. 200/6 A |
| 5,496,977 A | * | 3/1996 | Date et al. ................ 200/339 |
| 5,498,843 A | * | 3/1996 | Date et al. ................ 200/5 A |
| 5,621,196 A | * | 4/1997 | Nishijima et al. ......... 200/6 A |
| 5,689,095 A | * | 11/1997 | Kawase .................... 200/5 R |
| 5,939,796 A | * | 8/1999 | Tomassi et al. ........... 307/10.1 |
| 6,162,999 A | * | 12/2000 | Ishikawa et al. .......... 200/339 |
| 6,313,731 B1 | * | 11/2001 | Vance ...................... 200/5 A |
| 6,344,619 B1 | * | 2/2002 | Yamasaki et al. ......... 200/6 A |
| 6,359,243 B1 | * | 3/2002 | Nakade et al. ............ 200/6 A |

FOREIGN PATENT DOCUMENTS

DE 195 14 539 A1 10/1996

* cited by examiner

*Primary Examiner*—Michael Friedhofer
*Assistant Examiner*—Lisa Klaus
(74) *Attorney, Agent, or Firm*—Fay, Sharpe, Fagan, Minnich & McKee, LLP

(57) ABSTRACT

A mulitfunction switch, especially a mirror adjustment switch for motor vehicles, containing a housing (4, 6), and an actuating element (36) which protrudes from the housing. Said actuating element is mounted on a supporting peg (12, 28) in such manner that it can pivot around two approximately vertical pivoting axes situated one on top of the other and actuates, according to pivoting, one of four switches (46), said switches being arranged at equal angle distances around the peg. The peg (12, 28) is rotationally fixed to the actuating element (36) and can rotate around a housing-fixed rotational axis. At least one additional switch (56) is provided whose function is determined by the rotational position of the peg. Housing-fixed shaped areas (40) determine the ability of the actuating element (36) to pivot by means of the interaction of said shaped areas with shaped surfaces (48).

26 Claims, 3 Drawing Sheets

MULTIFUNCTION SWITCH

BACKGROUND OF THE INVENTION

The subject invention is directed to the switch art, and more particularly, to a multifunction electrical switch including a rotatable and pivotable actuation element.

Switches of the type under consideration are commonly used in motor vehicle applications to perform functions such as exterior mirror position adjustments. One such multifunction switch is described in DE 195 14 539 A1. The multifunction switch taught there includes an actuating element that is pivotable about two pivot axes arranged in a vertically spaced apart relative relation. The actuating element is operable for vertical height and lateral adjustment of exterior motor vehicle mirrors. In addition to the above, the multifunction switch described includes a separate pair of rammer-like actuating elements that are used to actuate or position the left and right exterior mirrors, respectively, against the exterior of the motor vehicle.

One drawback to the known multifunction switch described above is that a total of three (3) actuating elements are necessary. This makes the switch large, inexpensive to manufacture, and difficult to operate.

Accordingly, there is a need for a multifunction electrical switch that is relatively small, inexpensive to operate, and easy to use.

SUMMARY OF THE INVENTION

The subject invention provides a multifunction switch apparatus that overcomes the above-noted problems and results in a switch that is inexpensive and easy to use. In particular, and in accordance with one aspect of the invention, there is provided a multifunction switch apparatus which includes a housing defining at least one shaped area. A set of first switches, preferably four, are arranged within the housing. A rotatable actuation element extends from the housing and is selectively pivotally movable relative to the housing to engage and actuate at least one of the set of first switches. At least one second shaped area, preferably four projections, are movable in association with the actuation element for preventing the pivotal movement of the actuation element relative to the housing when the projection members are not located adjacent the set of recesses provided in the housing. In that way, the set of first switches are activated when the activation element is disposed in any one of four discrete rotational positions relative to the housing. At least one spring switch is disposed within the housing and is operable based upon a relative rotational position between the actuation element and the housing.

In accordance with a more limited aspect of the invention, the subject multifunction switch includes a single actuating element which is rotatable around an axis of rotation and, additionally, pivotable about two vertically spaced apart pivot axes which are each arranged at right angles relative to the actuating element axis of rotation. The position of the pivoting axis is beneficially defined by shaped surfaces formed by the housing member of the subject switch. The shaped surfaces cooperate with the actuating element so that the pivot directions remain constant, independent of the rotational position of the actuating element. In that way, numerous different functions can be controlled using the subject switch conveniently and ergonomically by means of pivoting the actuating element as well as by rotating same.

In one preferred application of the subject invention, the subject multifunction switch is utilized for mirror adjustments in motor vehicles. By rotating the actuating element into a first appropriate position, both mirrors in the motor vehicle can be controlled individually. In a second rotational position, both mirrors can be actuated for positioning against the exterior of the motor vehicle in a folded back orientation.

In accordance with a still further aspect of the invention, a support peg is provided in the housing, the support peg being selectively rotatable relative to the housing about a longitudinal rotational axis. The actuation element is pivotably connected with the support peg using a universal joint member. A screw spring is disposed in the housing surrounding the support peg for biasing the actuation element into a position of rest relative to the housing. A circuit panel is disposed within the housing and supports the set of first switches on a face side of the circuit panel. In that way, as the actuation element is moved pivotally relative to the housing, the switches are selectively actuated based upon contact between the switches and a peripheral region of the actuation element.

Still further, in accordance with yet another aspect of the invention, the at least one second switch is a spring switch movable in association with the actuation element. The spring switch engages electrical contact portions formed on the opposite side of a circuit panel disposed in the housing.

As can be seen from the foregoing, a primary object of the invention is the provision of a multifunction electrical switch that is operable to effect a plurality of electrical connections based upon a rotational and pivotable position of a single actuation element.

A further object of the invention is the provision of a multifunction switch apparatus which is inexpensive to manufacture and easy to use.

Still other objects, advantages, and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENTS

Figure 1:
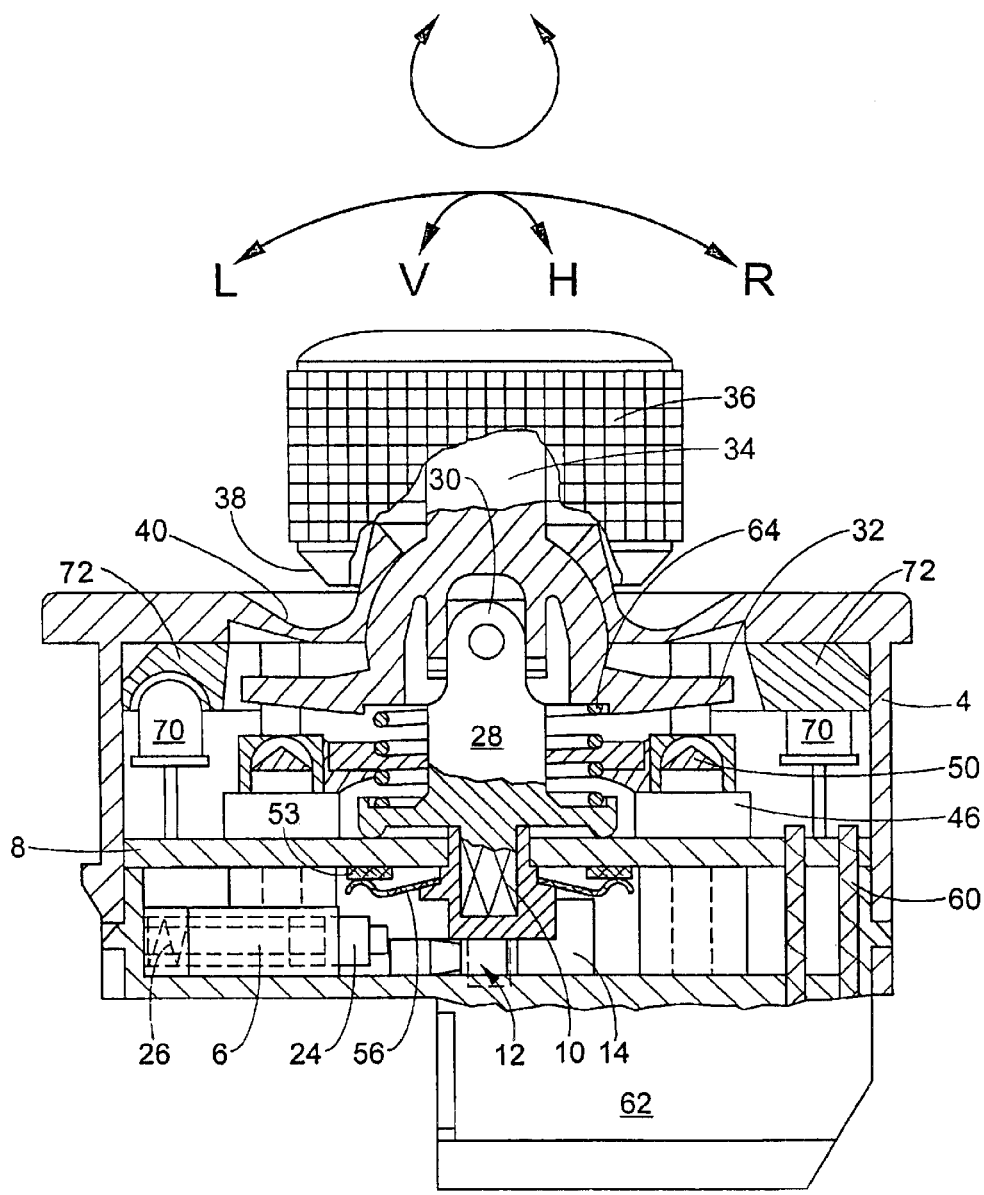
FIG. 1 is a cross-sectional view of a multifunction switch formed in accordance with the present invention taken centrally through the device along an axis of rotation of the switch actuation element.

Referring now to the drawings wherein the showings are for the purposes of illustrating the preferred embodiments of the invention only and not for purposes of limiting same, the overall arrangement of the preferred form of a multifunction switch formed in accordance with the invention can best be seen by reference to FIG. 1. As shown therein, the subject multifunction switch comprises an outer housing formed of a cap-shaped housing upper part 4 which is selectively clipped together with a housing lower part 6. A circuit panel 8 is arranged in the lower housing part 6 as shown. The circuit panel 8 includes a central opening adapted to receive a peg member 12 which extends therethrough substantially as shown. The upper portion of the peg 12 is formed into a square profile 10 and the lower portion of the peg 12 carries a cam 14 which is rotatably accepted in a recess of the housing lower part 6. Overall, the peg 12 is limited to rotational movement about a central vertical axis by means of the conductor plate 8 and the housing lower part 6.

Figure 5:
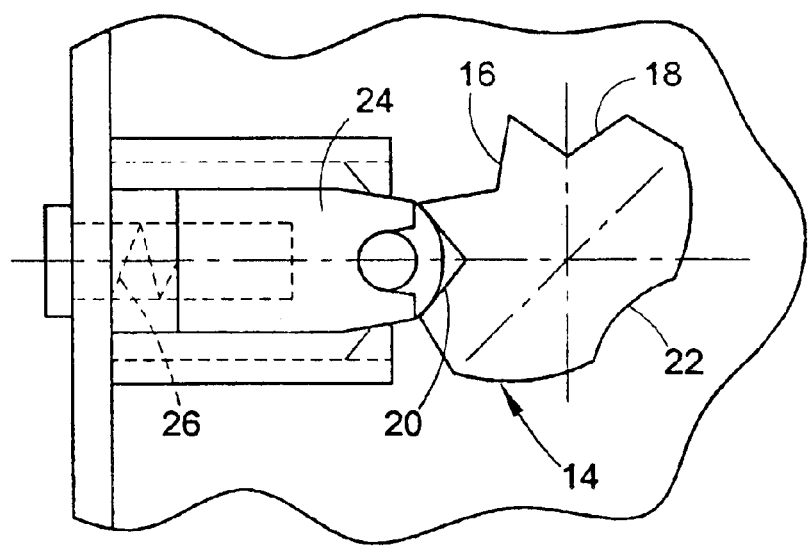

As best shown in FIG. 5, the cam 14 has, at its outer circumference, a plurality of engagement regions, preferably four concave recesses 16, 18, 20, and 22. In their preferred arrangement, the fourth recess 22 is offset by 180 degrees relative to the first recess 16. The second and third recesses 18, 20 are each respectively offset by 45 degrees on opposite sides of the first recess 16. The engagement surfaces provided by the concave recesses are adapted to receive a corresponding engagement surface provided on the lead end of a slider member 24. As shown in FIG. 5, the slider member is biased by a spring 26 in a direction toward the cam 14 and is guided using appropriate known structures within the housing lower part 6. In this manner, the recesses form locking or detent positions in which the rotational position of the peg 12 is locked.

With continued reference once again to FIG. 1, a second peg 28 is carried on the square portion 10 of peg 12. The second peg 28 includes upper arms for adapting the peg 28 for jointed connection with an actuation disk by means of a universal joint 30. Preferably, the actuation disk has an overall omega cross-sectional shape substantially as shown. The actuation disk includes a bell-shaped upper part ending in an upper direction in a shoulder 34. The shoulder portion of the actuation disk extends through a central opening of the housing upper part 4. In that way, an actuation button 36 can be positioned on the shoulder 34 exterior of the housing.

With continued reference to FIG. 1, the actuation element 36 carries a set of shaped areas movable in association therewith. Preferably, as shown in the Figure, the actuation element 36 carries four evenly spaced apart projections 38 each respectively offset by 90 degrees relative to the other. With appropriate rotational position of the actuation element 36 relative to the upper housing part 4 selected ones of the four projections 38 are embeddable, when the activation element is pivoted, into correspondingly formed recesses 40 formed in the upper housing part 4.

As is apparent from FIG. 1, the inside of the upper housing part 4 in the area of the bell-shape actuation disk 32 is shaped in accordance with the exterior contour of the actuation disk so that the actuation disk can be freely pivoted about any horizontal axis by means of the universal joint 30. The actual pivoting capability results from the ability to receive the projections 38 into the recesses 40. The projections and the recesses form intermateable shaped areas which determine the pivoting capability of the actuation member 36. Pivoting is disabled when the four projections 38 are not located adjacent the recesses 40.

Figure 2:
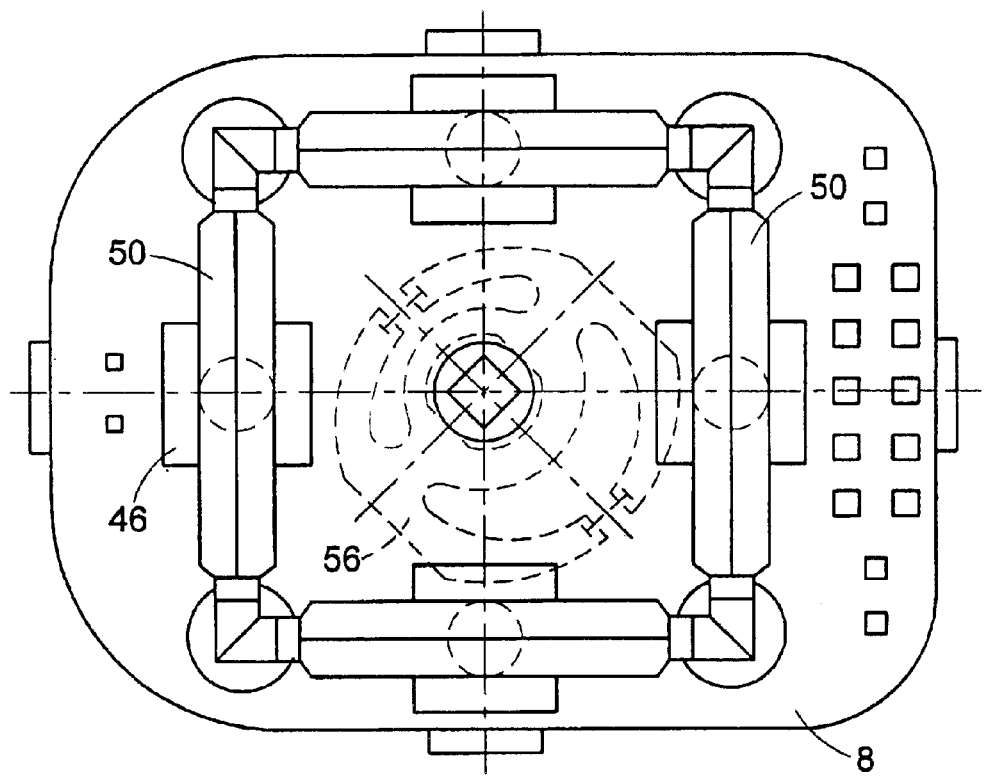
FIG. 2 is a top plan view of a circuit panel portion of the multifunction switch shown in FIG. 1.
Figure 3:
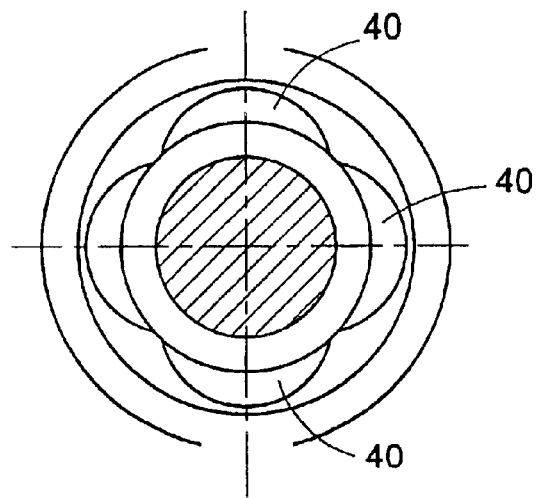
FIG. 3 is a top plan view of a middle region portion of the housing of the multifunction switch shown in FIG. 1.

Turning now to FIG. 2, four micro switches 46 are arranged on the circuit panel 8 in a relatively evenly spaced apart relationship. In addition, the micro switches 46 are disposed within the housing in alignment with the recesses 40. In that way, each of the four micro switches 46 can be selectively activated by contact with the front area of the actuation disk 32 during pivoting or tilting of the actuation member 36.

Figure 4:
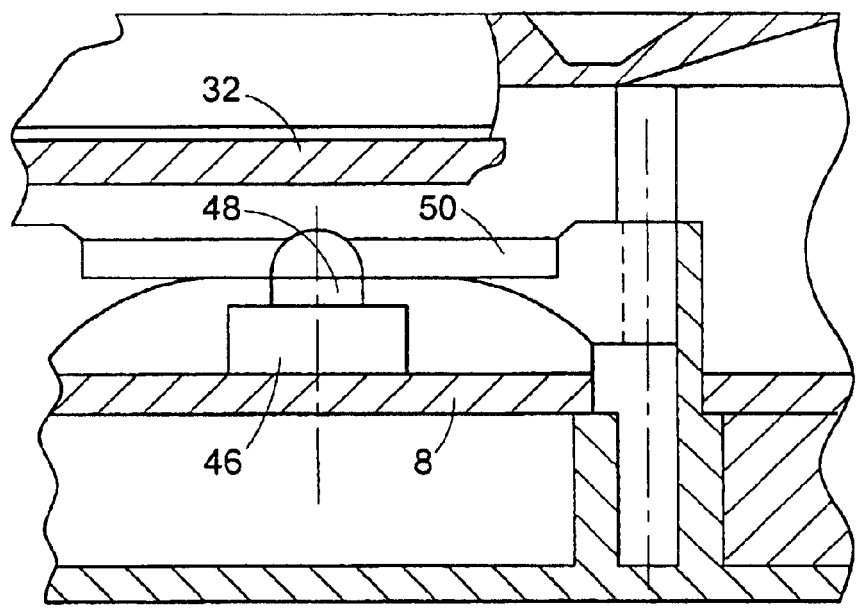
FIG. 4 is a view showing an enlarged portion of the cross-sectional showing of the subject multifunction switch of FIG. 1; and, FIG. 5 is a top partial plan view showing a spring and slider member portion of the multifunction switch shown in FIG. 1.

FIG. 4 depicts a magnification of the right-most micro switch 46 shown in FIG. 1 which is attached in turn to the circuit panel 8 and is connected with the circuit panel by electrically conductive means. The outer circumference of the actuation disk 32 is located adjacent the micro switch 46 so that when the actuation member 36 is pivoted in any of four directions as determined by the recesses 16, 18, 20, 22, the corresponding one of four micro switches is actuated. As shown in FIGS. 2 and 4, each micro switch 46 is actuated by contact with an actuation member 48. In order to ensure that the actuation members 48 of the micro switches 46 are not subjected to transverse forces while being operated, laterally guided small slider plates 50 are provided as shown. The slider plates 50 receive the actuation members 48 on a bottom side thereof and, on a top side, are adapted to engage the bottom surface of the actuation disk 32.

As shown best in FIGS. 1 and 2, a switch spring 56 is carried on the first peg 12 at the upper front surface of the cam 14 between the cam 14 and the circuit panel 8. Based upon the rotational position of the cam 14 and peg 12, the switch spring 56 connects various contacts 53 formed on the underside of the circuit panel 8 and, accordingly, establishes different switching conditions within the multifunction switch. Preferably, the circuit panel is provided with a set of contact pins 60 which project into a plug contact zone 62 formed at the underside of the housing part 6.

In order to bias the actuation disk 32 into a horizontal position of rest best shown in FIG. 1, a spring 64 is disposed around the second peg 28. The spring 64 is self-supported on the bottom at a collar of the peg 28 and engages at the top with the actuation disk 32. The first peg 12 and the second peg 28 jointly form a support peg on which is arranged the actuation disk 32.

FIG. 1 best shows luminous diodes 70 connected to the circuit panel 8 for illuminating, via suitable lighting circuits, symbols designed or formed at the front of the actuation member 36.

The assembly of the subject multifunction switch is simplified by its construction. More particularly, the spring 26, slider 24, and peg first 12 are first fitted into the lower housing part 6. Preferably, the contact pins 60 are formed integrally with the bottom of the lower housing part 6.

Next, the circuit panel previously fitted with the micro switch 46 and the luminous diodes 70 and lighting tracks 72 is placed on the contact pins 60 and preferably fastened to same by means of soldering or the like.

The biasing spring 64 is next placed onto the first peg 12 and then the second peg 28 is inserted onto the square portion 10 of the first peg 12. Preferably, the second peg 28 carries the universal joint 30. An actuation disk 32 is next placed onto the free axis of the universal joint 30. Subsequently, the upper housing part 4 is clipped together with the lower housing part 6 and the actuation member 36 is inserted.

The operability of the subject multifunction switch is enhanced by its construction. More particularly, with reference to FIG. 5, when the actuation button 36 is rotated from its position of rest (slider 24 in recess 16) toward the left and engaged into recess 20, the actuation member 36 can be pivoted to the left or right (dual arrow L/R) or out of the paper plane or into the paper plane (dual arrow V/H) which corresponds to an adjustment in height and a lateral adjustment of the exterior mirror of a motor vehicle.

If the actuation member 36 is rotated further to the right or left by 45 degrees, it is in a position of rest in which the projections 38 are not located adjacent the recesses 40 so that the actuation button cannot be further pivoted. Mechanical interference between the projections 38 and the top of the housing prevents pivotal movement of the actuation member 36.

However, if the actuation member 36 is further turned to the left or right by a subsequent 45 degree increment, the slider member 24 engages with the recess 18 so that the actuation member 36 can again be pivoted and adjustment to the other outside mirror is possible.

When the actuation member 36 is turned from its position of rest (slider member 24 engaged with recess 16) by 180 degrees, the slider member 24 engages into the recess 22. Thereupon, the actuation member is incapable of pivoting by interference between the projections 38 and the recesses 40. However, the switch spring 56 disposed on the underside of the circuit board 8 and carried by the peg 12 engages associated contact points (not shown) on the circuit board so that both outside mirrors fold against the exterior of the motor vehicle. Other switching configurations are contemplated and not shown but are understood by those skilled in the art upon reading, understanding, and benefitting from this description.

The operating position of the actuation member 36 is clearly observable from the front of the subject multifunction switch by means of the luminous diodes 70 and the lighting tracks 72 integrated into the upper housing part 4. Preferably, the actuation member 36 has one or more transparent portions.

The invention has been described with reference to the preferred embodiment. Obviously, modifications and alterations will occur to others upon a reading and understanding of this specification. As an example, peg 12 can be elastically prestressed in the direction toward the upper housing part 4 by arranging a spring between the cam 14 and the bottom of the lower housing part 6. In that way, the actuation button 36 can be fully pressed down and additional switching positions obtained by means of additional contact springs arranged between the peg 28 and the upper side of the circuit board 8. Further, additional switches can be operated with the slider 24 and/or the cam 14.

The subject multifunction switch can be employed in a wide range of applications where it is practical to switch a multitude of functions by pivoting, by turning, or pushing in and/or pulling out an actuation element. It is intended to include all such modifications and alterations insofar as they come within the scope of the appended claims or the equivalents thereof.

What is claimed is:

1. A multifunction switch, comprising:
   a housing:
   an actuation element protruding from the housing, rotatably arranged on a support peg around a pivot axes, actuating, according to a selected rotational position, one of four switches arranged at an equal angle distances around the support peg, the support peg being rotationally fixed to the actuating element and can rotatable around a housing-fixed rotational axis;
   at least one additional switch provided in association with the housing and having a switch function determined by the rotational position of the support peg, and;
   recessed areas provided on the housing which determine an ability of the actuation element to pivot by mechanical interference interaction with shaped areas carried on the actuation element.

2. A multifunction switch apparatus comprising:
   a housing defining at least one first shaped area said at least one first shaped area includes a plurality of recesses defined by said housing;
   a set of first switches arranged within the housing;
   a rotatable actuation element extending from the housing and being selectively pivotably movable relative to the housing to engage and actuate at least one of said set of first switches;
   at least one second shaped area movable in association with said actuation element for preventing said pivotal movement of the actuation element relative to the housing when the at least one second shaped area is not located adjacent said at least one of said plurality of recesses, said at least one second shaped area includes a plurality of engagement members carried on said actuation element; and,
   at least one second switch operable based on a relative rotational position between said actuation element and said housing.

3. The multifunction switch according to claim 2 wherein:
   said at least one first shaped area includes a plurality of recesses defined by said housing; and,
   said at least one second shaped area includes a plurality of engagement members camed on said actuation element.

4. The multifunction switch apparatus according to claim 3 wherein:
   said plurality of recesses includes four spaced apart recesses defined by said housing; and,
   said plurality of engagement members includes four spaced apart engagement members carried on said actuation element.

5. The multifunction switch apparatus according to claim 3 further comprising a support peg in the housing and selectively rotatable relative to the housing about a longitudinal rotational axis, said actuation element being pivotably connected with the support peg.

6. The multifunction switch apparatus according to claim 5 further including:
   a universal joint member for connecting the actuation element with the support peg.

7. The multifunction switch apparatus according to claim 6 further including a spring disposed adjacent said support peg for biasing said actuation element into a position of rest relative to said housing.

8. The multifunction switch apparatus according to claim 7 further including:
   a circuit panel disposed in said housing and surrounding said support peg, the circuit panel supporting said set of first switches on a face side of the circuit panel.

9. A multifunction switch apparatus comprising:
   a housing defining at least one first shaped area, the at least one first shaped area including a plurality of recesses defined by said housing;
   a set of first switches arranged within the housing;
   a rotatable actuation element extending from the housing and being selectively pivotably movable relative to the housing to engage and actuate at least one of said set of first switches;
   at least one second shaped area movable in association with said actuation element for preventing said pivotal movement of the actuation element relative to the housing when the at least one second shaped area is not located adjacent said at least one first shaped area, the at least one second shaped area including a plurality of engagement members carried on said actuation element;

the at least one second switch adapted to be operated based on a relative rotational position between said actuation element and said housing;

a support peg in the housing and selectively rotatable relative to the housing about a longitudinal rotational axis, said actuation element being pivotably connected with the support peg;

a universal joint member for connecting the actuation element with the support peg;

a screw spring disposed adjacent said support peg for biasing said actuation element into a position of rest relative to said housing;

a circuit panel disposed in said housing and surrounding said support peg, the circuit panel supporting said set of first switches on a face side of the circuit panel; and, a set of electrical contacts carried on a side of said circuit panel opposite said face side of the circuit panel, wherein said at least one second switch is a spring switch connected for rotation with the support peg whereby a plurality of electrical connections are selectively established based on a relative selected position between the spring switch and the circuit panel.

10. The multifunction switch apparatus according to claim 9 further including:
a cam member carried on said support peg; and,
a slider member biased for slidable movement towards said cam member.

11. The multifunction switch apparatus according to claim 10 wherein said cam member defines a plurality of engagement surfaces adapted to engage a distal end of the slider member, the plurality of engagement surfaces being spaced apart on the cam member to define a plurality of locked positions of the actuating element whereat pivotal movement of the actuation element relative to said housing is prevented by mechanical interferences between said plurality of engagement members carried on the actuation element and said housing.

12. The multifunction switch apparatus according to claim 11 wherein said at least one second switch is arranged on a surface of said cam member oriented towards said circuit panel.

13. The multifunction switch apparatus according to claim 12 wherein:
said plurality of said engagement surfaces defined by said cam member includes at least four spaced apart concave recesses.

14. The multifunction switch apparatus according to claim 13 wherein:
said actuation element defines an actuating disk portion having a peripheral rim area adapted to engage said set of first switches when the actuation element is moved pivotally relative to said housing, and a bell-shaped center area adapted for pivotal connection to said support peg using said universal joint member.

15. The multifunction switch apparatus according to claim 5 further including spring disposed adjacent said support peg for biasing said actuation element into a position of rest relative to said housing.

16. The multifunction switch apparatus according to claim 5 further including:
a circuit panel disposed in said housing and surrounding said support peg, the circuit panel supporting said set of first switches on a face side of the circuit panel.

17. The multifunction switch apparatus according to claim 16 further including:
a set of electrical contacts carried on a side of said circuit panel opposite said face side of the circuit panel, wherein said at least one second switch is a spring switch connected for rotation with the support peg whereby a plurality of electrical connections are selectively established based on a relative selected position between the spring switch and the circuit panel.

18. The multifunction switch apparatus according to claim 5 further including:
a cam member carried on said support peg; and,
a slider member biased for slidable movement towards said cam member.

19. The multifunction switch apparatus according to claim 18 wherein said cam member defines a plurality of engagement surfaces for engaging a distal end of the slider member, the plurality of engagement surfaces being spaced apart on the cam member to define a plurality of locked positions of the actuating element whereat pivotal movement of the actuation element relative to said housing is prevented by mechanical interferences between said plurality of engagement members carried on the actuation element and said housing.

20. The multifunction switch apparatus according to claim 19 wherein:
said plurality of said engagement surfaces defined by said cam member includes at least four spaced apart concave recesses.

21. A multi-function switch apparatus comprising:
a housing defining at least one first shaped area including a plurality of recesses defined by said housing;
a first set of first switches arranged on the housing;
an actuation element extending from the housing and being selectively rotatably and pivotably movable relative to the housing to engage and actuate at least one of said set of first switches;
at least one second shaped area on said actuation element for preventing said pivotal movement of the actuation element relative to the housing when the at least one second shaped area is not located adjacent said at least one first shaped area, the at least one second shaped area including a plurality of engagement members;
a support member in the housing and selectively rotatable relative to the housing about a longitudinal rotational axis, said actuation element being connected with the support member;
a circuit panel disposed in said housing adjacent said support member, the circuit panel supporting said set of first switches on a face side of the circuit panel; and,
a spring switch being operable based on a relative rotational position between said actuation element and said housing, the spring switch including a set of electrical contacts carried on a side of said circuit panel opposite said face side of the circuit panel, the spring switch being connected for rotation with the support member whereby a plurality of electrical connections between said set of electrical contacts are selectively established based on a relative selected position between the spring switch and the circuit panel.

22. The multifunction switch apparatus according to claim 21 further including:
a cam member carried on said support member; and,
a slider member biased for slidable movement towards the cam member to selectively hold the support member in selected positions relative to said housing.

23. The multifunction switch apparatus according to claim 22 wherein said cam member defines a plurality of engagement surfaces engaging a distal end of the slider member, the plurality of engagement surfaces being spaced apart on the cam member to define a plurality of locked positions of the actuation element whereat pivotal movement of the actuation element relative to the housing is prevented by mechanical interferences between said plurality of engagement members carried on the actuation element and said housing.

24. The multifunction switch apparatus according to claim 23 wherein said spring switch is arranged on a surface of said cam member oriented towards said circuit panel.

25. The multifunction switch apparatus according to claim 24 wherein said plurality of engagement surfaces defined by said cam member include at least four spaced apart recesses.

26. The multifunction switch apparatus according to claim 25 wherein said actuation element defines an actuating disk portion having a peripheral rim area engagable with said set of first switches when the actuation element is moved pivotally relative to said housing, and a center area adapted for pivotal connection to said support member using a universal joint member.

* * * * *